United States Patent [19]

Kustka et al.

[11] 4,343,759
[45] Aug. 10, 1982

[54] EQUALIZER SECTION

[75] Inventors: George J. Kustka, Ocean; Steven J. Sipek, Brick, both of N.J.

[73] Assignee: Bell Telephone Laboratories, Incorporated, Murray Hill, N.J.

[21] Appl. No.: 196,158

[22] Filed: Oct. 10, 1980

[51] Int. Cl.³ .............................................. H04L 25/03
[52] U.S. Cl. ....................................... 375/14; 364/724
[58] Field of Search ........ 364/724, 754, 200 MS File, 364/900 MS File; 375/12, 14, 16; 455/184, 185, 186

[56] References Cited

U.S. PATENT DOCUMENTS

| | | | |
|---|---|---|---|
| 3,868,603 | 2/1975 | Guidoux | 333/18 |
| 3,983,540 | 9/1976 | Keller et al. | 364/200 |
| 4,004,282 | 1/1977 | Weber et al. | 364/900 |
| 4,231,101 | 10/1980 | Eggermont | 364/724 |
| 4,285,061 | 8/1981 | Ho | 364/724 |

*Primary Examiner*—Benedict V. Safourek
*Attorney, Agent, or Firm*—Ronald D. Slusky

[57] ABSTRACT

A data signal receiver (100) forms line samples of a received modulated data signal and applies them to a fractionally spaced equalizer (150). The equalizer outputs are demodulated and decisions are formed as to the values of the transmitted data symbols. The equalizer itself is comprised of a plurality of equalizer sections (220, 240, 260, 280) each of which multiplies ones of the line samples with respective ones of a queue of coefficients to form a partial sum. The partial sums are combined to form the overall equalizer output. Timing recovery and tap rotation control signals generated within the equalizer are generated as a function of the location within the coefficient queue of a reference coefficient, the latter illustratively being the coefficient of largest complex magnitude. An arbitration circuit (680) within each equalizer section determines whether that section holds the reference coefficient. The equalizer section which determines that, in fact, it holds that the reference coefficient enables itself to generate the control signals in question to the exclusion of the other equalizer sections comprising the equalizer.

11 Claims, 7 Drawing Figures

EQUALIZER SECTION

BACKGROUND OF THE INVENTION

The present invention relates to equalizers such as are used in data receivers.

Much of today's data communication equipment, such as high speed voiceband data sets (modems), are comprised of high-density integrated circuits (ICs). The cost of designing and developing such ICs is relatively high. It is thus desirable that a particular IC design be able to be incorporated into a line of products rather than just a single product, thereby distributing the design and development costs over the entire line. The above considerations apply, in particular, to equalizers which are used in voiceband data sets to correct for channel-induced distortion, such as intersymbol interference. In the usual such equalizer, a predetermined number of previously-formed samples of a received data signal, referred to as line samples, are multiplied by respective ones of an ordered plurality, or queue, of coefficients and the resulting products are summed to form the equalizer output.

In designing an equalizer which can be used in more than one data set type, account must be taken of the fact that the length of the equalizer (i.e., the number of line samples (or coefficients) which are used to form each equalizer output) may differ for data sets operating at, for example, different bit rates. Advantageously, the requirement of different equalizer lengths can be accommodated by designing an equalizer IC which can be used as a modular building block, with two or more such "equalizer sections" being interconnected in series to provide an overall equalizer of the desired length. A further advantage of this building block approach is that the equalizer sections, or series connections of same, can be arranged in parallel to provide a so-called fractionally spaced equalizer.

SUMMARY OF THE INVENTION

In some applications, one or more control signals generated by or within the equalizer are coefficient-driven. By this is meant that at least one parameter of each such control signal e.g., its value or its duration, is a function of the current location within the coefficient queue of a reference coefficient. The latter is an individual one of the coefficients having a predetermined parameter, e.g., complex magnitude, which meets a predetermined criterion, e.g., is the largest. In equalizers comprised of two or more equalizer sections, as described above, the functions of determining the location of this "reference" coefficient and generating the appropriate control signal values could be performed by circuitry external to the equalizer sections themselves. Disadvantageously, however, such external circuitry adds to the bulk and expense of the equalizer.

The present invention obviates the need for such external circuitry. In an equalizer of the multi-section type which embodies the principles of the invention, each equalizer section first determines whether it holds the reference coefficient. The equalizer section which determines that it holds the reference coefficient enables itself to generate the control signal or signals in question, to the exclusion of the other equalizer sections comprising the equalizer.

In determining whether it holds the reference coefficient, each equalizer section identifies a reference coefficient candidate by identifying the coefficient among the coefficients stored within itself which meets the reference coefficient criterion. The equalizer sections them compare their candidates to determine which of those candidates, overall, satisfies the reference coefficient criterion.

In an illustrative embodiment of the invention, the reference coefficient is the coefficient having the largest complex magnitude and each equalizer section develops an arbitration word—illustratively a binary word—which is indicative of the complex magnitude of its candidate. The arbitration words are then used to determine the state of an arbitration bus to which each of the equalizer sections is connected, the arbitration bus illustratively being a single lead which normally has a first state, e.g., a first signal level.

The arbitration proceeds in steps, with corresponding portions, e.g., corresponding bits, in the several arbitration words determining the bus state in each step, starting with the most-significant bit of each word. Within each step, in particular, each equalizer section either does pull on the arbitration bus, causing the signal on the bus to switch to a second state, or level, or does not pull on the bus depending on the value of the bit of its arbitration word under consideration in that step. If a particular equalizer section pulls on the bus in a given step, or if no equalizer section pulls on the bus, that sections's candidate is still in contention to be the reference coefficient. If, on the other hand, a particular equalizer section does not pull on the bus, but another equalizer section does pull on the bus, this indicates that the candidate of another equalizer section has a larger complex magnitude. Accordingly, the equalizer section in question drops out of the arbitration and does not generate the coefficient-driven control signal or signals in question.

DETAILED DESCRIPTION

Figure 1:
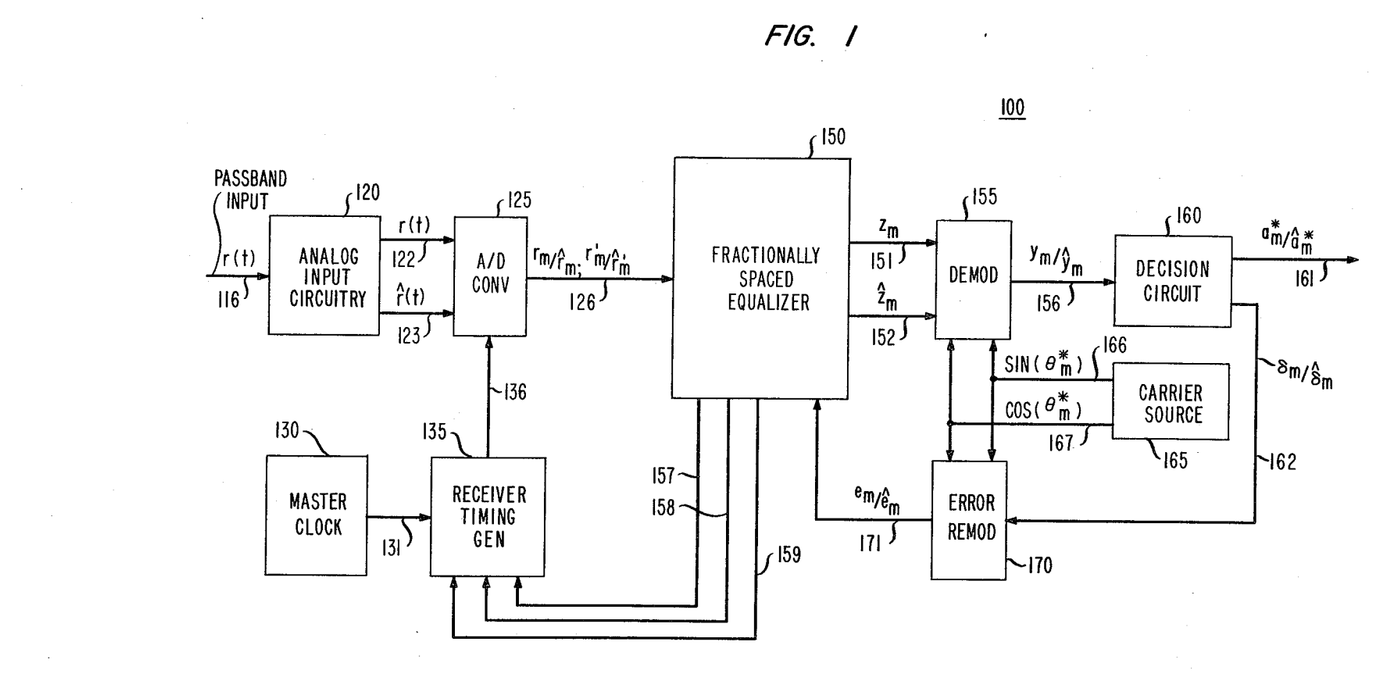
FIG. 1 shows a data signal receiver which includes a fractionally spaced equalizer.

Receiver 100 shown in FIG. 1 is adapted for use in a voiceband data set, or modem. Although not shown in the FIG., receiver 100 may operate under microprocessor control.

Receiver 100 is illustratively used in a communication system employing quadrature-amplitude modulation (QAM). In particular, four information bits, comprising a so-called data symbol, are communicated once every $T = 1/2400$ sec. The symbol rate is thus 2400 baud, yielding a binary data transmission rate of 9600 bits per second. The four bits to be transmitted are encoded into two signal levels, each of which can take on one of the four values $+1$, $-1$, $+3$, $-3$. The two signal levels amplitude modulate respective 1800 Hz in-phase and quadrature-phase carrier waves which, in combination, comprise the transmitted QAM signal.

The QAM signal, representing a succession of data symbols transmitted at a ratte of 1/T symbols per second, is received by receiver 100 on lead 116. This passband input signal, $\hat{r}(t)$, passes to analog input circuitry 120 comprised of a bandpass filter and Hilbert transform circuit. The output of circuitry 120 is comprised of a Hilbert transform pair r(t) and r(t) derived from the received passband signal. These are passed to an A/D converter 125 on leads 122 and 123.

A master clock 130 generates 128 master clock pulses every T seconds on lead 131. These are received by receiver timing generator 135. The latter counts the pulses on lead 131 and generates timing signals on a number of output leads to control the sequencing of the various signal processing functions within the modem. One of these leads shown explicitly is lead 136. The latter extends pulses to A/D converter 125 at a rate which causes A/D converter 125 to generate line samples at p/T samples per second. The parameter p is illustratively equal to 2. A/D converter 125 thus generates two passband, i.e., modulated, line samples $R_m$ and $R_m'$ during the $m^{th}$ receiver symbol interval. (An alternative way of generating $R_m$ and $R_m'$ is to first sample and digitize the received signal at a rate at least equal to twice its highest frequency component and then pass the resulting signal through a digital phase-splitter.)

QAM signals are conveniently expressed and processed as complex numbers, each having a real and imaginary component. The real and imaginary components of the line samples formed by A/D converter 125 are provided one after the other in serial form as separate ten-bit digital signals, or words, on lead 126. (Each of the other signal leads similarly carries its signals in serial form.) Notationally, the real and imaginary components of sample $R_m$ are represented as $r_m$ and $\hat{r}_m$. Those of sample $R_m'$ are represented as $r_m'$ and $\hat{r}_m'$.

Line samples $R_m$ and $R_m'$, which are spaced T/2 seconds apart, are equalized by fractionally spaced equalizer 150 described hereinbelow. It suffices to say for the present that the outputs of equalizer 150 on leads 151 and 152 are generated once per symbol interval and are, respectively, the real and imaginary components $z_m$ and $\hat{z}_m$ of a passband equalizer output $Z_m$. (It should be noted at this point that, due to processing delay in equalizer 150, passband equalizer output $Z_m$ is not necessarily generated during the $m^{th}$ receiver interval, the latter being defined as the T second interval during which line samples $R_m$ and $R_m'$ are generated. The subscript m in "$Z_m$" thus does not identify when $Z_m$ is generated but, rather, identifies $Z_m$ as being the passband equalizer output which is next generated after line samples $R_m$ and $R_m'$ are applied to the equalizer. Similar considerations apply, for example to signals $Y_m$, $A_m^*$, $\Delta_m$ and $E_m$ discussed below.)

It may also be noted at this point that equalizer 150 extends coefficient-driven timing control signals to receiver generator 135 over leads 157–159. These signals are generated in accordance with the present invention, as described in detail hereinbelow.

Passband equalizer output $Z_m$ is demodulated to baseband by demodulator 155. The demodulated output of demodulator 155 is baseband equalizer output $Y_m$. Baseband equalizer output $Y_m$ is hereinafter referred to as equalizer output $Y_m$. It has real and imaginary components $y_m$ and $\hat{y}_m$, provided one after the other as twelve-bit words on lead 156. The demodulator 155 is expressed in complex notation as $$Y_m = Z_m e^{-j\theta_m^*}$$

where $\theta_m^*$ is an estimate of the carrier phase. For purposes of generating $Y_m$ in accordance with the above expression, demodulator 155 receives nine-bit digital representations of $\sin(\theta_m^*)$ and $\cos(\theta_m^*)$ on output leads 166 and 167 of carrier source 165.

Components $y_m$ and $\hat{y}_m$ are quantized in decision circuit 160. The resulting outputs, provided one after the other on lead 161, are decisions $a_m^*$ and $\hat{a}_m^*$ as to the signal levels which represent components $a_m$ and $\hat{a}_m$ of a particular transmitted symbol $A_m$. Decisions $a_m^*$ and $\hat{a}_m^*$ can be thought of as the real and imaginary components of a complex decision $A_m^*$.

Decision circuit 160 also provides, on lead 162, the real and imaginary components, $\delta_m$ and $\hat{\delta}_m$, of a complex baseband error signal $\Delta_m$ associated with the data symbol in question. Error signal $\Delta_m$ is equal to the quantity $(Y_m - A_m^*)$. In particular, $\delta_m = (y_m - a_m^*)$ and $\hat{\delta}_m = (\hat{y}_m - \hat{a}_m^*)$, with $\delta_m$ and $\hat{\delta}_m$ being expressed as respective twelve-bit words. Error signal $\Delta_m$ is remodulated in error remodulator 170 to yield a remodulated, or passband, error signal $E_m$ given by $$E_m = \Delta_m e^{+j\theta_m^*}.$$

In order to form the remodulated error signal, remodulator 170, like demodulator 155, receives $\sin(\theta_m^*)$ and $\cos(\theta_m^*)$ from the carrier source 165.

(An alternative way of generating error signal $E_m$ would be to remodulate complex decision $A_m^*$ and subtract it from passband equalizer output $Z_m$. In either case, the value of $E_m$ is the same, it being equal to the difference, modulated at the carrier frequency, between the pre- and post-quantized values of equalizer output $Y_m$.)

Real and imaginary components $e_m$ and $\hat{e}_m$ of error signal $E_m$ are extended one after the other to fractionally spaced equalizer 150 on lead 171 for purpose of coefficient updating, as described below.

Figure 2:
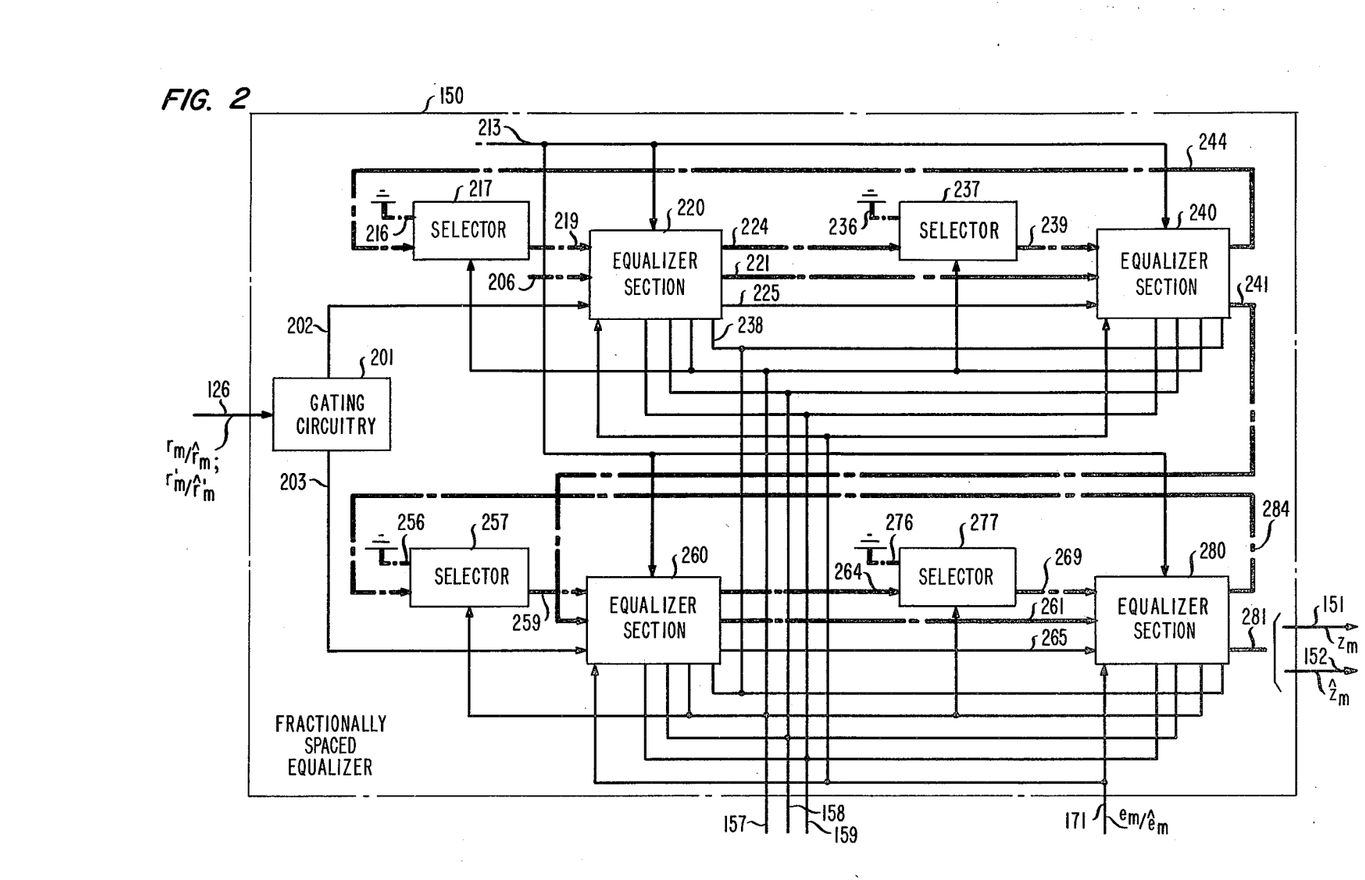
FIG. 2 shows the above-mentioned equalizer, which is comprised of a plurality of equalizer sections each of which embodies the principles of the invention.

As shown in FIG. 2, fractionally spaced equalizer 150 is comprised of four substantially identical equalizer sections 220, 240, 260 and 280. Each equalizer section holds at least (M+d) complex line samples, where M is a selected integer, such as 16, and d is no less than the number of symbol intervals which elapse between the generation of line samples $R_m$ and $R_m'$ and the generation of error signal $E_m$. The d extra line samples are needed for coefficient updating, as set forth below. Illustratively, d=2.

Equalizer 150 also includes gating circuitry 201, which receives line samples $R_m$ and $R_m'$ on lead 126. The former sample is held in gating circuitry 201 until the latter sample is received. Line sample $R_m$ is then extended via lead 202 to equalizer section 220. Line sample $R_m'$ is concurrently extended via lead 203 to equalizer section 260. The oldest samples in equalizer sections 220 and 260--$R_{m-(M+d)}$ and $R_{m-(M+d)}'$—are discarded. In addition, each of equalizer sections 220 and 260 transfers the $M^{th}$ oldest line sample stored therein—$R_{m-M}$ and $R_{m-M}'$, respectively—to equalizer sections 240 and 280 via leads 225 and 265, respectively. Equalizer sections 240 and 280 store these line samples and discard their oldest line samples $R_{m-(2M+d)}$ and $R_{m-(2M+d)}'$, respectively.

For each symbol interval, each of the equalizer sections multiplies the M newest, i.e., most-recently-formed, line samples stored therein by respective complex coefficients stored therein and forms the sum of the resulting products, referred to as a partial sum. The four partial sums are then added together to form equalizer output $Z_m$ previously described.

In particular, equalizer sections 220, 240, 260 and 280 respectively form the partial sums $$\sum_{i=1}^{M} C_i(m)R_{m-i+1}, \sum_{i=M+1}^{2M} C_i(m)R_{m-i+1}, \sum_{i=1}^{M} C_i'(m)R'_{m-i+1} \text{ and}$$

$$\sum_{i=M+1}^{2M} C_i'(m)R'_{m-i+1}.$$

In these expressions the $C_i(m)$'s and $C_i'(m)$'s are the above-mentioned complex coefficients. Each coefficient has a particular value associated with the $m^{th}$ receiver symbol interval and, as can be seen from the above expressions, each coefficient is multiplied by a line sample which bears a predetermined temporal relationship to the most recently formed line sample. Thus, for example, coefficient $C_1'(m)$ is always multiplied by the most recently formed line sample $R_m'$; coefficient $C_1(m)$ is always multiplied by the second most recently formed line sample $R_m$, and so on.

Equalizer section 220 thereupon transfers the real and imaginary components of its partial sum to section 240 in serial form via separate leads in cable 221. Equalizer section 240 adds these to the real and imaginary components of its own partial sum and passes the result on to section 260 via leads within cable 241 and so on. To begin this accumulation process, a "dummy" signal, equal to zero, is applied to equalizer section 220 (by circuitry not shown) over cable 206. (Since addition is a commutative operation, the partial sums generated by the four equalizer sections can be added in any order desired.) The ultimate equalizer output components $z_m$ and $\hat{z}_m$ are provided by section 280 on leads 151 and 152 of a cable 281.

Each equalizer section then updates the coefficient values stored therein to provide coefficient values associated with the $(m+1)^{st}$ symbol interval. The updating rule illustratively used in equalizer sections 220 and 240 is $$C_i(m+1) = C_i(m) - \alpha E_m - dR_{m-i-d+1} - \alpha\mu SGN[C_i(m)]$$

and that illustratively used in sections 260 and 280 is $$C_i'(m+1) = C_i'(m) - \alpha E_m - dR'_{m-i-d+1} - \alpha\mu SGN[C_i'(m)],$$

where d is as defined above, $\alpha$ and $\mu$ are selected constants, and the value of the complex function SGN[X] is $+1+j$ depending on the signs of the real and imaginary components of its complex argument X. In order to implement these updating rules—which embody the so-called mean-squared updating algorithm, modified in accordance with the tap leakage technique taught in commonly-assigned U.S. patent application of R. D. Gitlin et al, Ser. No. 16,495 filed Mar. 1, 1979, now U.S. Pat No. 4,237,554 issued Dec. 2, 1980—each equalizer section receives the real and imaginary error signal components $e_m$ and $\hat{e}_m$ provided on lead 171.

Figure 3:
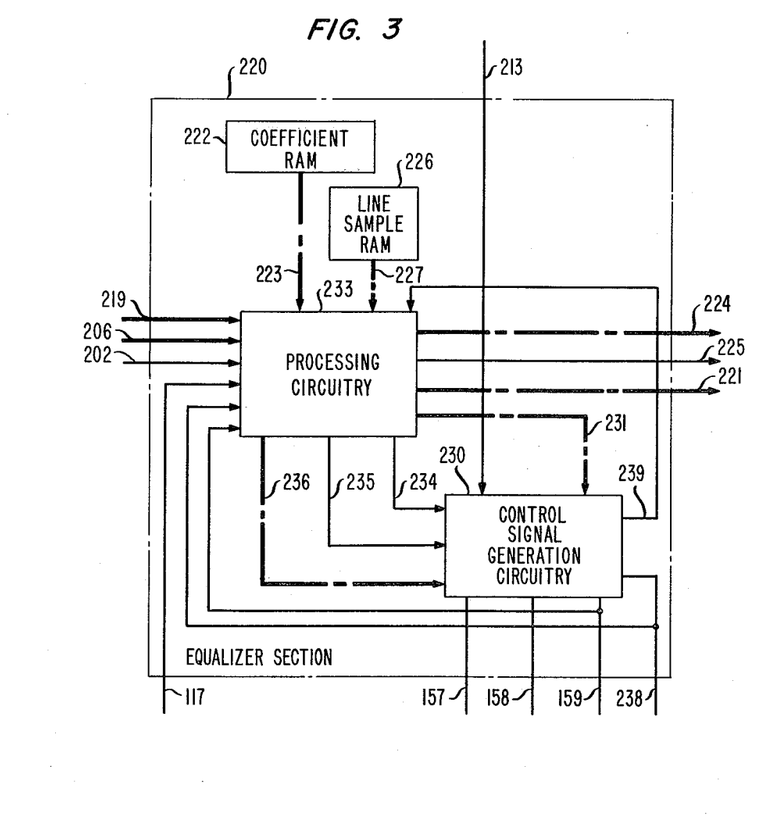
FIG. 3 shows an illustrative realization of one of the equalizer sections shown in FIG. 2.

By way of example, FIG. 3 shows the constituents of equalizer section 220. Its line samples and coefficients are stored in line sample random access memory (RAM) 226 and coefficient RAM 222, respectively. The generation of coefficient-driven control signals in accordance with the present invention is performed by control signal generation circuitry 230. All other signal processing, including the generation of control signals internal to the equalizer section which are not coefficient-driven, is performed by processing circuitry 233. The functions of circuitry 233 thus include the generation and accumulation of partial sums, as described above, and the updating of coefficients. For the latter purpose, circuitry 233 receives the error signal on lead 171. Circuitry 233 communicates with RAMs 222 and 226 via cables 223 and 227, respectively. As described in furthr detail below, circuitry 233 also provides to circuitry 230 coefficient values over leads 234 and 235 and coefficient addresses over cable 236.

Illustratively, two types of control signals generated by equalizer 150 are coefficient driven—timing recovery control signals and tap rotation control signals. In the following discussion, the concept of timing recovery will first be explained. The circuitry within equalizer 150 which generates the timing recovery control signals in accordance with the invention will then be described. Next, the concept of tap rotation will be discussed, followed by a description of the circuitry within equalizer 150 which generates the tap rotation control signals in accordance with the invention.

Timing recovery relates to the fact that the coefficient values subsisting in an equalizer at any given time will yield accurate equalization only if the received signal is sampled at or near a particular set of time points on the received signal, i.e., only if it is sampled with the appropriate timing "epoch." The frequencies of the transmitter and receiver clocks invariably differ from one another, if only by a very small amount. Over time, this frequency difference, if not compensated for, would cause the received signal to be sampled further and further away from the appropriate time points, i.e., with an increasingly erroneous timing epoch. As long as the sampling frequency is high enough, the equalizer has the ability to compensate for this clock frequency difference (as long as it is not too large) via the coefficient update process. This is not an effective long-term solution, however, because the distribution of coefficient values will eventually become skewed to one end of the coefficient queue and equalizer performance will degrade sharply.

To deal with this problem, the receiver is conventionally provided with a so-called timing recovery circuit. The timing recovery circuit determines whether the line samples are being formed earlier (later) than they should be and, in response, adjusts the phase of the line sample forming circuitry such that the line samples are formed a little later (sooner) than they otherwise would. This phase adjustment process is referred to as retarding (advancing) the receiver timing or, alternatively, as retarding (advancing) the sampling phase. The amount by which the receiver timing is advanced or retarded is referred to herein as the timing adjustment increment.

As described in the co-pending U.S. patent application of G. J. Kustka, Ser. No. 185,017, filed Sept. 8, 1980, entitled "Timing Recovery Technique," the magnitude of the timing adjustment increment may advantageously be selected as a function of a "reference" coefficient. The latter is illustratively the coefficient having the largest complex magnitude. This approach is followed in the present illustrative embodiment. Specifically, if the coefficient of largest complex magnitude (herein also referred to simply as the "largest coefficient") is coefficient $C_M(m)$ or coefficient $C_{M+1}'(m)$, timing is to be respectively retarded or advanced by an increment, or amount, $\Delta T$. If the largest coefficient is coefficient $C_M'(m)$ or $C_{M+1}(m)$, timing is to be respectively retarded or advanced by a greater increment, $3\Delta T$, and so forth.

As also previously noted, and as can be seen from FIG. 1, timing control signals, which define the direction and magnitude of timing adjustments, are generated by equalizer 150 on leads 157–159. These signals are extended to receiver timing generator 135, which adjusts the receiver sampling phase accordingly. In accordance with the invention, as shown in FIG. 2, each equalizer section comprising equalizer 150 is connected to leads 157–159. Each equalizer section determines whether it holds the largest coefficient. The equalizer section which determines itself to, in fact, hold the largest coefficient, enables itself to generate the timing recovery control signals on leads 157–159 to the exclusion of the other equalizer sections.

As previously noted and as shown in FIG. 3, control signal generating circuitry 230 is that component of equalizer section 220 which determines whether equalizer section 220 holds the largest coefficient and which generates the signals on leads 157–159 if equalizer section 220 does hold that coefficient. (Circuitry 230 also generates tap rotation control signals in accordance with the invention, as described below.) Each other equalizer section of equalizer 150 includes substantially identical control signal generating circuitry.

Figure 5:
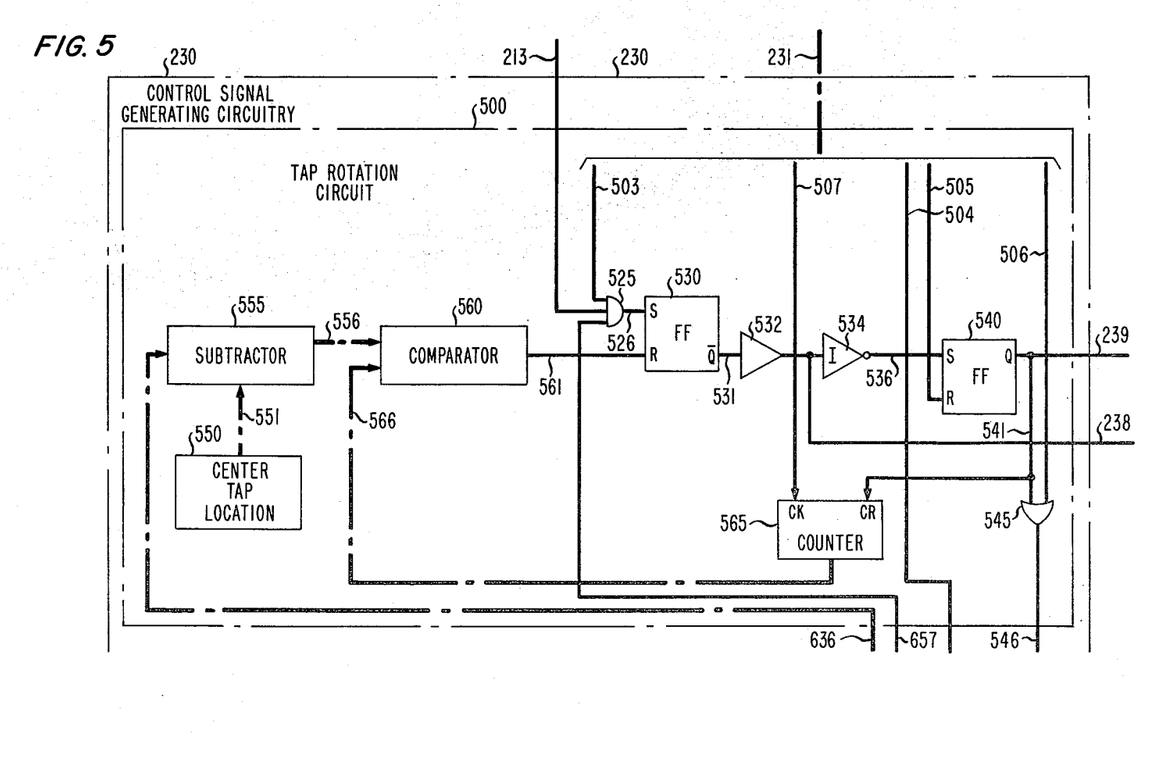
FIGS. 5 and 6 when arranged as shown in FIG. 7, show an illustrative realization of control signal generating circuitry within the equalizer section of FIG. 3.
Figure 6:
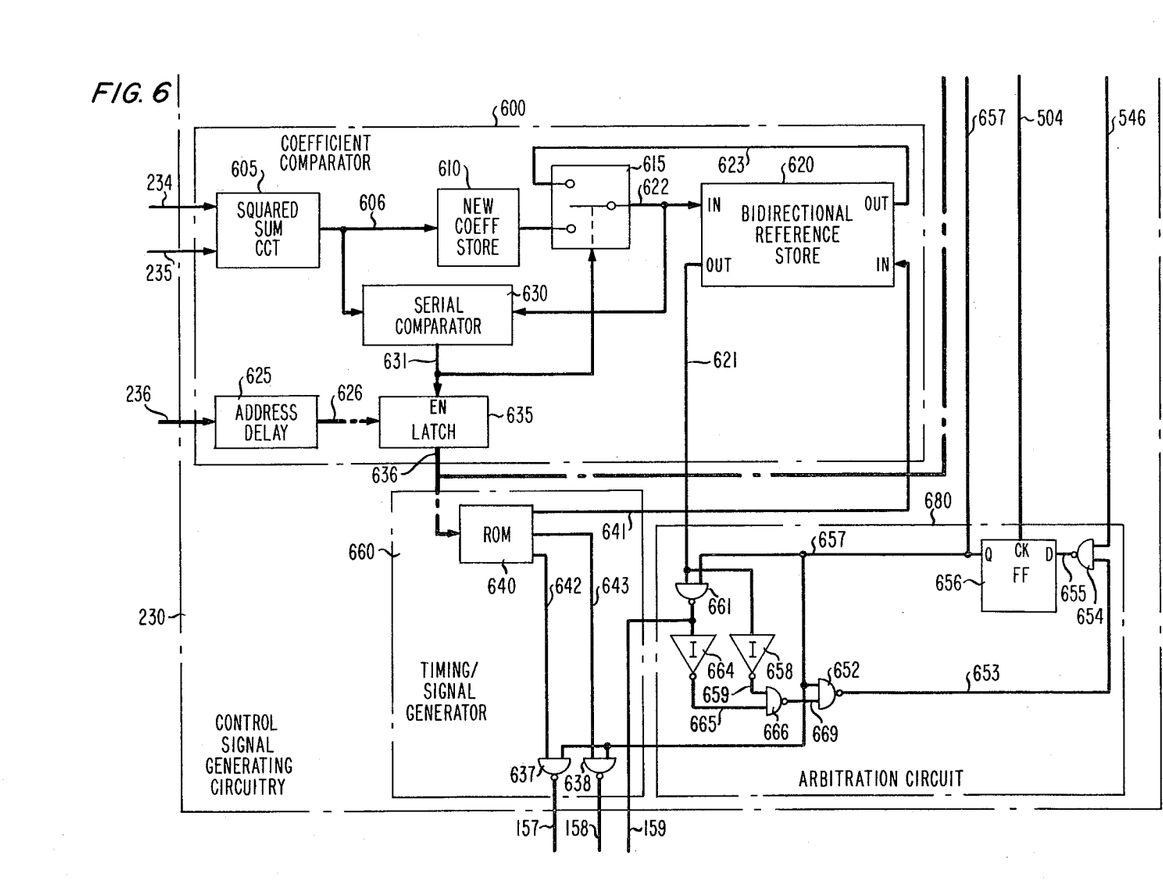
Figure 7:
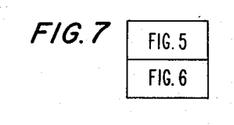

FIGS. 5 and 6, when the former is placed above the latter, as depicted in FIG. 7, show an illustrative realization of control signal generating circuitry 230. Only those components of circuitry 230 relating to the generation of timing recovery control signals on leads 157–159 will be discussed for the present. Those components, more particularly, are coefficient comparator 600, timing signal generator 660 and arbitration circuit 680, all of which are shown in FIG. 6.

The overall operation of these components is as follows: Once per symbol interval, comparator 600 identifies the largest squared magnitude (i.e., sum of the squares of the real and imaginary components) of all the coefficients stored in equalizer section 220, and it stores an "arbitration word" representing that largest squared magnitude. Comparator 600 also stores a local address for the coefficient-referred to as the reference coefficient candidate-from which the arbitration word was derived. This address indicates the location of the reference coefficient candidate within the coefficient queue relative to the other coefficients stored in equalizer section 220.

Unless otherwise inhibited (as described below), arbitration circuit 680 also operates once per symbol interval. Its function is to compare, via an arbitration process also to be described, the arbitration word stored in comparator 600 with the arbitration words stored in the coefficient comparators within the other three control signal generating circuitries. If comparator 600 is determined to not hold the largest arbitration word, circuitry 230, and thus equalizer section 220, perform no part in the generation of the timing recovery control signals on leads 157–159. If, on the other hand, it is determined that comparator 600 does hold the largest arbitration word, section 220 is known to hold the reference coefficient and arbitration circuit 680 enables timing signal generator 660 to control, i.e., generate the timing signals on, leads 157–159.

The detailed operation of the components of FIG. 6 is as follows: The 12-bit real and imaginary components of each coefficient are clocked concurrently into squared sum circuit 605 of comparator 600 from leads 234 and 235, respectively. Circuit 605 provides on lead 606 a 12-bit number representing the sum of the squares of the real and imaginary components clocked in from leads 234 and 235. (The magnitude of a complex number is equal to the square root of the sum of the squares of its real and imaginary components. However, since the coefficient magnitudes, per se, are not of interest, but only the location of the coefficient having the largest magnitude, it is sufficient to use the sum, i.e., the squared magnitude, as the arbitration word, without taking the square root. Moreover, if a particular coefficient component is greater than unity, its square may be approximated by its absolute value in forming the squared magnitude. This approach may result in occasional slight errors but, advantageously, avoids having to provide storage capability for large numbers.) Circuit 605 may be realized, for example, as an arithmetic circuit or as a read-only memory look-up table.

Comparator 600 further includes new and reference coefficient stores 610 and 620, respectively. Both stores are illustratively shift registers whose contents are initially cleared. Store 620, in particular, is a bidirectional shift register which is operated in a shift-right mode at this time. Comparator 600 also includes a serial comparator 630. As the bits of each squared magnitude are clocked serially out of circuit 605 onto lead 606, they are concurrently clocked into both store 610 and a first input of comparator 630. At the same time, the contents of store 620, representing the largest squared magnitude thus far provided by circuit 605 in the current receiver symbol interval, are read out onto lead 623.

Lead 623 extends to a switch 615. Although the latter is represented as a mechanical device to facilitate explanation, it is, in actuality, a gating circuit of conventional design. Assuming that switch 615 is in the up position, the squared magnitude on lead 623 is read back into store 620 via lead 622 and is also applied via that lead to the second input of comparator 630. The output signal of comparator 630 is held in a latch internal thereto and is provided on lead 631. If the squared magnitude most recently on lead 606 is not as large as that read out of store 620, comparator output lead 631 is low, i.e., in the "0" state. This causes switch 615, the position of which is controlled by the lead 631 signal, to be maintained in the up position as previously assumed. Thus, the squared magnitude in store 620 will again be read back into that store when the next comparison is made.

If, on the other hand, the squared magnitude most recently on lead 606 is larger than that read out of store 620, lead 631 is high, i.e., in the "1" state. This causes switch 615 to be in the down position. Thus, as the next squared magnitude is clocked into store 610 and comparator 630, it will be compared not to the squared magnitude in store 620, but, rather, to that previously stored in store 610 and now extended to comparator 630 via switch 615 and lead 622. In addition, store 620 will now receive as its input the squared magnitude previously stored in store 610, so that that magnitude will be the one to which the subsequent squared magnitude provided by circuit 605 is compared.

Thus, once all of the coefficients stored in RAM 222 have been processed, reference store 620 holds the largest squared magnitude for those coefficients.

Comparator 600 also includes address delay 625 and latch 635. As each coefficient is presented to circuit 605, its address, i.e., its location within the queue of coefficients stored in equalizer section 220, is presented via lead 236 to delay 625. The delay imparted by the latter is equal to the combined delays in circuits 605 and 630 so that as each squared magnitude is presented to new coefficient store 610, its address is concurrently presented to latch 635. Whenever comparator 630 operates switch 615 via lead 631 to cause a new squared magnitude to be entered into reference store 620, it also enables latch 635 via its input EN to read in and store the address associated with the coefficient used to calculate that new squared magnitude.

Figure 4:
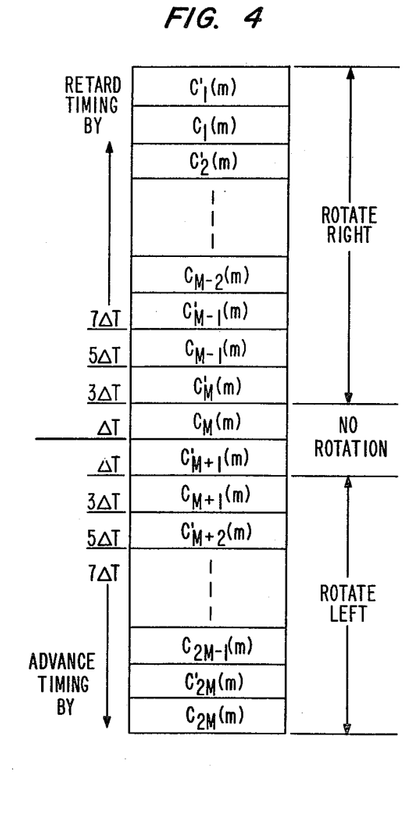
FIG. 4 shows how the values of several coefficient-driven control signals are determined as a function of the location within the overall coefficient queue of a reference coefficient.

The address stored in latch 635 is provided in parallel form over cable 636 to read-only memory (ROM) 640 of timing signal generator 660. Although not shown in FIG. 6, ROM 640 also receives signals which are hardwired at the time of manufacture to indicate the position of the coefficients stored in RAM 222 within the overall coefficient queue of FIG. 4. In this example, all of the coefficients are in the front of the queue. In other embodiments, however, one portion of the coefficients stored in a particular equalizer section may be in the front of the queue and the others in the back.

Based on the signals provided to it, ROM 640 generates on its output leads 641, 642 and 643 the timing recovery control signals which should be provided on leads 159, 157 and 158, respectively, if reference store 620 were, in fact, to hold the largest squared magnitude within all four equalizer sections. In particular, lead 641 carries an advance/retard signal and leads 642 and 643 carry the timing adjustment increment magnitude.

During the determination of largest squared coefficient magnitude, store 620 operates in a shift-right mode, as previously noted. Thus, the least- (most-) significant bit of the squared magnitude stored therein is in the right-most (left-most) stage. When the above-mentioned arbitration begins, store 620 is operated in a shift-left mode so that the bits of the squared magnitude stored therein are extended most-significant-bit first to arbitration circuit 680 via lead 621. As each bit is applied to arbitration circuit 680, the corresponding bits of the squared magnitudes stored in the other three control signal generating circuits are concurrently extended to their associated arbitration circuits.

Lead 159 is normally high. As each bit of the squared magnitude in store 620, for example, is extended to circuit 680, the latter responds by pulling lead 159 low if and only if two conditions are met. The first is that the bit from store 620 is a "1" and the second is that circuit 680 has not yet dropped out of the arbitration. If, on the other hand, the bit from store 620 is a "0" but lead 159 is pulled low by another one of the arbitration circuits, circuit 680 drops out of arbitration, i.e., it will no longer pull lead 159 low for the duration of the current arbitration, because this indicates that the squared magnitude stored in the reference store within another control signal generating circuit is larger than that stored in reference store 620.

Arbitration for a given symbol interval is initiated by processing circuitry 233 (FIG. 3). Circuitry 233 pulls lead 506 of cable 231 from a high to a low state, causing the output of OR gate 545 (FIG. 5) on lead 546 to go low. (The other input to gate 545 is low at this time.) With lead 546 low, the output of NAND gate 654 on lead 655 is high. As each bit is clocked out of store 620, D-type flip-flop 656 is clocked by an arbitration clock pulse provided by circuitry 233 on lead 504 of cable 231, so that the high state on lead 655 is stored in the flip-flop and provided at its Q output on lead 657. Lead 506, and thus lead 546, thereafter return to the high state.

Assume that the above-mentioned first bit clocked out of reference store 620 is a "1". The output of NAND gate 661 on lead 159 is thus low. Any of the other three arbitration circuits which receive a "0" from their respective reference stores drop out of the arbitration at this point, i.e., inhibit themselves from pulling lead 159 low; the low state of lead 159 indicates to any such circuits that the reference store in at least one other equalizer section-in this case equalizer section 220-holds a larger squared magnitude and thus that the reference coefficient candidate of any such circuit is not the reference coefficient.

Since lead 621 is high, the output of inverter 658 on lead 659 is low and thus the output of NAND gate 666 on lead 669 is high. Since lead 657 is also high, the output of NAND gate 652 on lead 653 is low. Thus, the output of NAND gate 654 on lead 655 is high. Lead 657 thus remains high when flip-flop 656 is clocked in concurrence with the appearance on lead 621 of the second-most-significant bit of the squared magnitude in store 620.

Assume that that second-most-significant bit is a "0" but that the second-most-significant bit of the squared magnitude stored in each of the other timing recovery circuits still in the arbitration is also "0". Lead 159 thus remains high so that the output of inverter 664 on lead 665 is low and the output of NAND gate 666 on lead 669 is high. Thus, lead 653 is low and 655 is high. Accordingly, lead 657 is still high when flip-flop 656 is clocked in concurrence with the appearance of the third-most-significant squared magnitude bit on lead 621.

Assume, on the one hand, that that third-most-significant bit is a "0" but the third-most-significant bit of the squared magnitude stored in another timing recovery circuit still in the arbitration, is "1". This means that the squared magnitude in store 620 is not the largest and that circuit 680 should drop out of the arbitration. In particular, both inputs to gate 666 are now high so that lead 669 is low, causing the output of gate 652 on lead 653 to be high. Since lead 546 is also high, lead 655 is low. During arbitration with respect to the fourth-most-significant bit (and all subsequent bits), then, lead 657 is low. This prevents gate 661 from pulling lead 159 low no matter what the subsequent bit values on lead 621. That is, circuit 680 has dropped out of arbitration.

Assume, on the other hand, that the squared magnitude in store 620 is, in fact, the largest over all. In this case one or the other of leads 659 and 665 will always be low (as in the above examples with respect to the most- and second-most-significant bits) and circuit 680 remains in the arbitration to the end. Store 620 thereafter continues to receive shift pulses, causing the advance/retard signal on lead 641, which has been shifted into each stage of store 620 as the squared magnitude bits have been shifted out, to appear on lead 621. Since lead 657 is high, (a) the advance/retard bit value now being shifted onto lead 621 controls the state of lead 159 and (b) the outputs of ROM 640 on leads 642 and 643 control the states of leads 157 and 158 via NAND gates 637 and 638, respectively. At this time, receiver timing generator 135 (FIG. 1) responds to the signals on leads 157-159 to effect the timing adjustment.

If the largest squared magnitude appears in two or more timing recovery circuits, each of their arbitration circuits will attempt to control the states of leads 157-159. As a result, as long as any one of those arbitration circuits specifies a "0" for a particular one of leads 157-159, that lead will, in fact, carry a "0" irrespective of the signals on the other two leads. This may result in an occasional erroneous timing adjustment. Such erroneous adjustments, however, will typically have no significant effect on long term timing recovery. Moreover, the possible deleterious effects of such erroneous timing adjustments can be mitigated by pairing up the various possible signal combinations on leads 157 and 158 with the various timing adjustment increment magnitudes in such a way that the smaller magnitudes are represented by signals having more "0"s, e.g., $\Delta T=00$, $3\Delta T=01$, $5\Delta T=10$, $7\Delta T=11$. In this way, the magnitude of any erroneous timing adjustment will be no larger than the smallest adjustment specified by any of the competing timing recovery circuits.

As previously noted, another type of coefficient-driven control signal illustratively generated within equalizer 150 concerns tap rotation. This function relates to the fact that it is typically desirable to have the largest coefficient values near the center of the coefficient queue. However, such a distribution of coefficient values may, in fact, not obtain when an initial set of coefficient values is determined during equalizer start-up. That is, the largest coefficients may be much closer to one end of the coefficient queue than the other. Thus at an appropriate point in the equalizer start-up process, the coefficient values are shifted or "rotated," within the coefficient queue to achieve the desired distribution.

In the present illustrative embodiment, the desired distribution is assumed to obtain if the coefficient of largest complex magnitude is located at substantially the center of the queue. Thus in performing tap rotation, the location of that coefficient is identified. If it is one of coefficients $C_1'(m)$ through $C_M'(m)$, the coefficient values are rotated such that coefficient $C_M(m)$ or $C_{M+1}'(m)$ has the largest value. This is referred to as a rotation to the right. If on the other hand, the largest coefficient is one of coefficients $C_{M+1}(m)$ through $C_{2M}(m)$, the coefficient values are rotated such that coefficient $C_M(m)$ or $C_{M+1}'(m)$ has the largest value. This is referred to as a rotation to the left. If either coefficient $C_M(m)$ or coefficient $C_{M+1}'(m)$ has the largest value, no rotation is performed.

Tap rotation control signals are generated within equalizer 150 on leads 159 and 238, which are connected to each equalizer section. (Lead 159, it will be recalled, also serves as a timing recovery control lead.) In particular, the signal on lead 159 controls the direction of tap rotation (i.e., left or right). The signal on lead 238 controls the extent of the tap rotation (i.e., the number of locations of shift in the coefficient queue).

In accordance with the invention, the signals on these leads are determined by the equalizer section which holds the reference, i.e., (in this example) largest, coefficient. In particular, when a tap rotation is to be performed, the equalizer section which holds the largest coefficient pulls down lead 238, which is normally high. This indicates to the processing circuitry in each equalizer section (e.g., 233) that rotation is to begin, with the direction of rotation being indicated by the signal on lead 159. As long as lead 238 is held low, rotation continues, with all four equalizer sections rotating concurrently. Once tap rotation has proceeded to the point that the largest coefficient is in the desired location within the coefficient queue, as described above, the equalizer section which holds that coefficient, and which is thus controlling lead 238, brings lead 238 high and rotation stops.

Rotation proceeds a step at a time. For each step of a rotation to the right, the values of coefficients $C_i(m)$ and $C_i'(m)$ become the values of coefficients $C_{i+1}(m)$ and $C_{i+1}'(m)$, respectively. For rotation to the left, the values of coefficients $C_i(m)$ and $C_i'(m)$ become the values of coefficients $C_{i-1}(m)$ and $C_{i-1}'(m)$, respectively.

Moreover, for each step of a rotation to the right, the values of coefficient $C_1'(m)$ and $C_1(m)$ stored in equalizer sections 220 and 260, respectively, are made to be zero. In addition, in order for the values of coefficients $C_M'(m)$ and $C_M(m)$, stored in equalizer sections 220 and 260, respectively, to become the values of coefficients $C_{M+1}'(m)$ and $C_M(m)$, those values are shifted to equalizer sections 240 and 280, respectively. (The values of coefficients $C_{2M}'(m)$ and $C_{2M}(m)$ stored in equalizer sections 260 and 280, respectively, are simply lost.) Similarly, for each step of a rotation to the left, the values of coefficients $C_{2M}'(m)$ and $C_{2M}(m)$ are made to be zero and the values of coefficients $C_{M+1}'(m)$ and $C_{M+1}(m)$ in sections 240 and 280, respectively, are shifted to sections 220 and 260 to become the values of coefficients $C_M'(m)$ and $C_M(m)$, respectively. In either a rotation to the right or left, of course, the value of each other coefficient stored in a particular equalizer section remains therewithin, but is shifted to the right or left by one location.

As shown in FIG. 2, equalizer 150 further includes selectors 217, 237, 257, and 277, which are respectively associated with equalizer sections 220, 240, 260 and 280. During a rotation to the right, selectors 217 and 257 extend zeros in the form of ground potential to equalizer sections 220 and 260 on cables 219 and 259, respectively. That ground potential is provided to selectors 217 and 257 from cables 216 and 256, respectively. At the same time, the values of coefficients $C_M'(m)$ and $C_M(m)$ are provided by equalizer sections 220 and 260 to selectors 237 and 277, respectively, via respective leads in cables 224 and 264, whence they are extended to equalizer sections 240 and 280 via cables 239 and 269, respectively.

During a rotation to the left, selectors 237 and 277 extend zeros to equalizer sections 240 and 280 in the form of ground potential taken from cables 236 and 276. At the same time, the values of coefficients $C_{M+1}'(m)$ and $C_{M+1}(m)$ are provided by equalizer sections 240 and 280 to selectors 217 and 257, respectively, via respective leads within cables 244 and 284 whence they are extended to equalizer sections 220 and 260.

The direction of rotation is indicated to the selectors by the rotation direction control signal on lead 159.

Attention is now redirected to control signal generating circuitry 230 shown in FIGS. 5 and 6. With respect to the tap rotation control signal on lead 159, little need be said. It will be recalled that arbitration circuit 680 in conjunction with the arbitration circuits in each other equalizer operates once every symbol interval to determine the location of the largest coefficient. Since, the signal on lead 159 at the end of each arbitration is an indication of whether the largest coefficient is in the front or back of the coefficient queue, that signal not only indicates the proper direction of timing adjustments, as already described, but, whenever a tap rotation is called for also the direction of same. It thus remains only to describe how the signal on lead 238 is generated.

Circuitry 230 includes a tap rotation circuit 500 which, in turn, includes a flip-flop 530. The state of that flip-flop determines whether equalizer section 220 controls lead 238. In particular, when a tap rotation is to take place, control circuitry (not shown) within the data set raises lead 213. This lead extends to one input of AND gate 525. Another input of AND gate 525 is taken from lead 503 of control lead cable 231 extending from processing circuitry 233 (FIG. 3). The signal on this lead is high during those portions of each symbol interval when initiation of a tap rotation would not interfere with some ongoing process in equalizer section 220, e.g., coefficient updating. A third input of AND gate 525 is taken from lead 657 of arbitration circuit 680. As will be recalled, that lead is high only if equalizer section 220 was found to hold the largest coefficient at the end of the most recent arbitration. Thus, the output of AND gate 525 on lead 526 is high only if, (a) a tap rotation is required, (b) it is now an appropriate time within the symbol interval to begin it, and (c) equalizer section 220 is to be the section which controls it. Assuming all three conditions are met, the high state of lead 526 switches flip-flop 530 to its set state. Its $\overline{Q}$ output on lead 531—initially high—is thus pulled low. The output of buffer amplifier 532 on tap rotation control lead 238 is thus pulled low and tap rotation begins. (If equalizer section 220 did not hold the largest coefficient, tap rotation would, of course, still have begun because the tap rotation circuit in another one of the equalizer sections would have pulled lead 238 low. By assuming that the largest coefficient is within equalizer section 220, however, we will see how and when lead 238 is returned to the high state.)

In particular, tap rotation circuit 500 further includes a set of terminals 550 which are wired high or low during manufacture to provide a word on cable 551 indicating the local address of coefficient $C_M(m)$. As previously noted, the largest coefficient value is to be rotated to the location of coefficient $C_M(m)$ when, as has been assumed, that coefficient is within equalizer section 220. (Although it is not necessary, a portion of that same word may serve as the above-described signal which indicates to ROM 640 (within timing signal generator 660) the position within the overall coefficient queue of the coefficients stored within RAM 222.)

The word on cable 551 is subtracted from the address of the largest coefficient on lead 636. That difference indicates how many steps of rotation are to be performed to position the largest coefficient value at the location of coefficient $C_M(m)$. This difference is extended over cable 556 to one input of comparator 560. The other input of comparator 560 is provided by a counter 565 over cable 566. The count in counter 565 is initially zero because a flip-flop 540 is initially in its reset state. Thus its Q output is low. Lead 541, which extends to the CR (clear) input of counter 565, is thus low and holds the counter cleared.

When lead 238 goes low, as previously described, the output of inverter 534 on lead 536 goes high. Flip-flop 540 switches to its set state, lead 541 goes high and counter 565 is enabled to respond to clock pulses (described below) at its CK input. The fact that lead 541 is high precludes further arbitration inasmuch as output lead 546 of OR gate 545 is now held high, even if lead 506 were to be pulled low. In addition, the now high state of lead 239, which is a tap off of lead 541, provides an indication to certain circuits within processing circuitry 233 that, since a rotation is in progress, certain operations, such as coefficient updating, should be inhibited.

The clock pulses for counter 565 are generated as follows: As previously noted, lead 238 extends to the processing circuitry within each equalizer section, e.g., to circuitry 233 within equalizer section 220. Circuitry 233 (as well as each of the other three processing circuitries) effects one step of rotation in the direction indicated by the signal on lead 159 and upon completing this, provides a pulse on lead 507 of cable 231. That lead extends to the CK input of counter 565, causing the count therein to be incremented. As long as the count on cable 566 is less than the difference on cable 556, the output of comparator 560 on lead 561 remains low. The state of flip-flop 530 thus remains unchanged and rotation continues.

Once the count on cable 566 and the difference on cable 556 are equal, rotation stops. In particular, lead 561 is now high. Flip-flop 530 is reset so that its $\overline{Q}$ output is high and thus lead 238 once again becomes high. The reset input of flip-flop 530 overrides its set input so that if the count on cable 566 and the difference on cable 556 are initially equal, flip-flop 530 will not switch states when lead 526 goes high and, thus, a tap rotation is not initiated.

Processing circuitry 233 periodically provides a high level on lead 505 of cable 231 during those portions within each symbol interval that a return to normal operations within the processing circuitry is appropriate. As long as lead 536 is high, flip-flop 540 does not respond to the signal on lead 505 but, rather, remains in its set state. Lead 536 goes low at the end of rotation, however, so that the subsequent high level on lead 505 resets flip-flop 540. Lead 239 thus goes low, indicating to the above-mentioned circuits within circuitry 233 which inhibit coefficient updating and other functions during rotation, that those functions can be resumed. The low level of lead 541, in addition, clears counter 565.

Tap rotation circuit 500 can also be used to control the "jam setting" of coefficients. Jam setting is a technique used, for example, in a control data set which communicates with a number of tributary data sets in a so-called multipoint network. The control data set may advantageously be provided with a bulk memory in which are stored previously-learned sets of equalizer coefficients, one associated with each of the tributaries.

When the control data set is to receive data from a particular tributary, the corresponding set of coefficients is read out of memory and loaded, or "jam set," into the equalizer. This obviates the need for the control data set to redetermine an appropriate set of coefficient values each time it communicates with a particular tributary.

In providing the data set of FIG. 1 with the ability to jam set coefficients, one would provide an additional input for each of selectors 217, 237, 257 and 277. In operation, the selectors would be caused to apply the coefficients read out of the above-mentioned bulk memory to their respective equalizer sections. The tap rotation circuits in each equalizer section would be configured such that each of them would pull down lead 238 in response to a jam set command from the data set control circuitry (not shown) and lead 159 would be forced to indicate a rotation to the right. The jam set coefficients for the tributary in question would then be loaded into the coefficient RAM within each equalizer section just as though a rotation to the right were taking place. In this mode of operation, counter 565 (and the counter in each of the other three equalizer sections) would be configured to raise lead 561, and thus stop the rotation, after M rotation steps, thereby completing the jam setting.

The foregoing merely illustrates the principles of the invention. For example, the invention may be applied to coefficient-driven control signals other than timing recovery and tap rotation control signals. In addition, parameters other than "complex magnitude" can be used as the basis for identifying the reference coefficient. For example, the reference coefficient may be the coefficient whose real component, or imaginary component or, either, meets some predetermined criterion, e.g., is the largest. It should also be appreciated that the invention can be used in equalizers in which each coefficient has only one component, i.e., is "real." The "complex magnitude" of such a coefficient is simply the magnitude of its one component. It is also to be noted that the invention can be used in baseband as well as passband equalizers and in baud equalizers as well as fractionally spaced equalizers.

Thus it is anticipated that those skilled in the art will be able to devise numerous arrangements which, although not explicitly shown herein, embody the principles of the invention.

We claim:

1. Data receiver circuitry of the type which generates an equalized signal in response jointly to an input signal and the values of an ordered plurality of coefficients, said circuitry generating at least a first control signal which is a function of the location in said ordered plurality of an individual one of said coefficients which meets a predetermined criterion, said circuitry including a plurality of sections (220, 240, 260, 280) each of which stores respective ones of said coefficients, characterized in that each section includes means (600, 680) for making a determination as to whether said one coefficient is stored in that section and means (500 or 620, 640, 661) for generating said control signal if said one coefficient is determined to be stored in that section.

2. The invention of claim 1 wherein the magnitude of at least one component of said coefficients determines which of said coefficients meets said criterion.

3. The invention of claim 1 wherein said one coefficient is the one of said coefficients which has the largest complex magnitude.

4. The invention of claims 1, 2 or 3 wherein said control signal has a first value if said one coefficient is within a first portion of said ordered plurality and a second value if said one coefficient is within a second portion of said ordered plurality.

5. Data receiver circuitry of the type which generates an equalized signal in response jointly to an input signal and the values of an ordered plurality of coefficients, said circuitry including a plurality of sections (220, 240, 260, 280) each of which stores respective ones of said coefficients, characterized in that each section includes means (600, 680) for determining an individual one of said coefficients meeting a predetermined criterion is stored in that section and means (620, 640, 661) for generating at least a first control signal if said one coefficient is determined to be stored in that section, at least one parameter of said first control signal being a function of whether said one coefficient is within a first portion of said ordered plurality or a second portion of said ordered plurality.

6. The invention of claim 5 further characterized in that said each equalizer section further includes means (640, 642, 643) for generating a second control signal if said one coefficient is determined to be stored in that section, at least one parameter of said second control signal being a function of the distance in said ordered plurality between the location of said one coefficient and a predetermined second location.

7. The invention of claims 5 or 6 wherein the magnitude of at least one component of said coefficients determines which of said coefficients meets said criterion.

8. The invention of claims 5 or 6 wherein said one coefficient is the one of said coefficients which has the largest complex magnitude.

9. Data receiver circuitry of the type which generates an equalized signal in response jointly to an input signal and the values of an ordered plurality of coefficients, said circuitry generating at least a first control signal which is a function of the location in said ordered plurality of an individual one of said coefficients, a predetermined parameter of said one coefficient meeting a predetermined criterion, said circuitry including a plurality of sections (220, 240, 260, 280) each of which stores respective ones of said coefficients, characterized in that each one of said sections includes means (600, 680) for making a determination as to whether said one coefficient is stored in said one section and means for generating said control signal if said one coefficient is determined to be stored in said one section.

10. The invention of claim 9 wherein said determining means includes means (600) for generating a plurality of signals each being a function of said predetermined parameter of a respective one of the coefficients stored in said one section, and arbitration means (680) for making said determination by comparing the one of said signals which meets said criterion with the one of said signals which meets said criterion generated by each other of said sections.

11. The invention of claim 10 wherein said circuitry further includes a bus (159) normally having a fast signal state, and wherein said arbitration means includes means (661) operative during each of a succession of time periods for switching said bus to a second state if a portion of said one of said signals which is associated with said time period has a predetermined value and means (652, 654, 656, 658, 664, 666) for determining that said one coefficient is stored in other than said one section if said portion does not have said predetermined value and said bus is in said second state.

* * * * *